United States Patent [19]

Holmgren

[11] Patent Number: 4,924,172
[45] Date of Patent: May 8, 1990

[54] CAPACITIVE SENSOR AND ELECTRONIC CIRCUIT FOR NON-CONTACT DISTANCE MEASUREMENT

[75] Inventor: William A. Holmgren, Colorado Springs, Colo.

[73] Assignee: Kaman Instrumentation Corporation, Colorado Springs, Colo.

[21] Appl. No.: 236,598

[22] Filed: Aug. 25, 1988

[51] Int. Cl.$^5$ .................. G01R 1/06; G01R 1/067
[52] U.S. Cl. ................................. 324/664; 324/690
[58] Field of Search .............. 330/191, 194, 206; 324/61 R, 61 P, 61 QS, 60 R, 60 C, 61 QL; 333/121, 100; 73/301 C

[56] References Cited

U.S. PATENT DOCUMENTS

| | | | |
|---|---|---|---|
| 3,896,697 | 7/1975 | Iannone | 84/1.16 |
| 4,160,204 | 7/1979 | Holmgren et al. | 324/207 |
| 4,203,087 | 5/1980 | Kovac et al. | 324/61 R |
| 4,339,709 | 7/1982 | Brihier | 324/61 R |
| 4,439,725 | 3/1984 | Ogasawara | 324/61 R |
| 4,771,247 | 9/1989 | Jacomb-Hood | 330/277 |

FOREIGN PATENT DOCUMENTS

| | | | |
|---|---|---|---|
| 1176383 | 8/1964 | Fed. Rep. of Germany | 324/61 P |
| 85-03120 | 7/1985 | PCT Int'l Appl. | 324/61 P |
| 2131176 | 6/1984 | United Kingdom | 324/61 P |

OTHER PUBLICATIONS

"A Capacitance Humidity-Sensing Transducer", by Thoma et al., IEEE Trans. on Comp., Hyb., & Mem. Tech., vol. CHMT-2 #3, 9/79, pp. 321-323.

*Primary Examiner*—Reinhard J. Eisenzopf
*Assistant Examiner*—W. Burns
*Attorney, Agent, or Firm*—Fishman, Dionne & Cantor

[57] ABSTRACT

A novel thin, three-terminal capacitive transducer which is positioned in a clearance gap to be measured is presented. This transducer comprises an insulated assembly having three parallel conductive planes with the first and second plane each containing a single electrode and the third plane containing a pair of spaced electrodes. Preferably, each electrode is composed of a thin layer of copper mounted on an insulated substrate such as an epoxy-glass composite. An air space is provided between each of the pair of electrodes in the third plane and the single electrode in the second plane. Another important feature of the present invention is a novel electronic circuit for use in conjunction with the novel three terminal capacitive transducer. This circuit provides a means of "synthetic resonance" whereby a small capacitance (such as generated by the three-terminal capacitive sensor of this invention) functions as if it were at or near series resonance with a synthesized large inductance. This is achieved by using a synthesized network (which is a variation of a known twin-tee circuit) in the feedback path of a high gain amplifier, thereby inverting the normal rejection notch into a resonance-like peak at a frequency determined mathematically.

34 Claims, 6 Drawing Sheets

U.S. Patent    May 8, 1990    Sheet 1 of 6    4,924,172
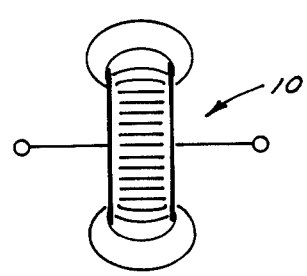
FIG. IA
(Prior Art)
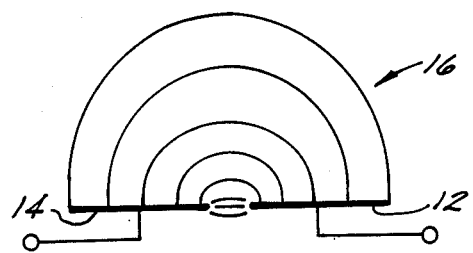
FIG. IB
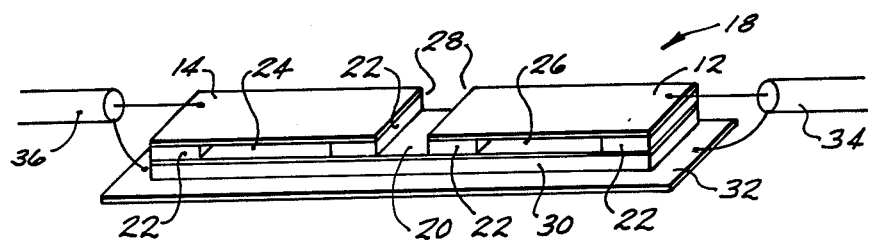
FIG. 2A
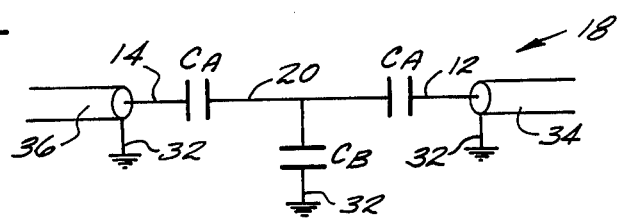
FIG. 2B
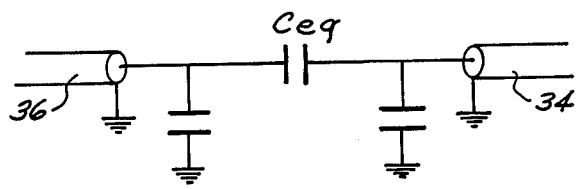
FIG. 3

CAPACITIVE SENSOR AND ELECTRONIC CIRCUIT FOR NON-CONTACT DISTANCE MEASUREMENT

BACKGROUND OF THE INVENTION

This invention relates generally to electronic non-contact distance measuring systems and the electronic circuitry employed therewith. More particularly, this invention relates to a novel electronic capacitive gap measuring transducer and a novel circuit termed a twin tee synthetic resonance circuit which may be used in conjunction with the measuring transducer.

There has been a continuing need for efficient and accurate devices capable of measuring gap widths or clearances without contact between spaced boundaries of a gap. For example, the difficulties of measuring the clearance gap between two plates has long plagued the art of metrology. The simple and known technique of inserting the "just fits" stacks of calibrated "feeler" shims has the disadvantage of contact inaccuracies as well as being a time consuming, non-electrical output measurement. Thus, the problem of verifying alignment of an automobile door often still requires a caliper measurement of clay daubs which have been squashed in the gap.

Prior art electronic devices are known to accomplish such contactless gap measurements. In these prior measurement systems, electromagnetic induction phenomena has often been employed to sense proximity or distance changes between a transducer and a metal object. Such measurement systems are useful in a wide variety of applications particularly where it is impossible or undesirable that there be physical contact with the object defining the distance to be measured. Other applications include pressure transducers, accelerometers, electronic micrometers, dimension comparators, bore gages, limit gages and liquid metal level detectors.

Previous electromagnetic induction measuring systems have not achieved the degree of accuracy and stability necessary for concise and accurate distance measurements. Certain limitations have restricted the development of these prior art systems, such as the difficulty in obtaining sufficient sensitivity and resolution over the effective measurement range of the system. This limitation results from the failure of the prior art systems to distinguish between the magnetic properties of the object and to compensate for these properties. Another limitation has been error caused temperature variations. Temperature changes cause impedance changes in the object and in the inductive distance measuring components of the system, and these impedance changes are reflected as a change in distance when in reality no such change may have occurred. A further problem with prior art systems has been that of non-linearity.

U.S. Pat. No. 4,160,204, which is assigned to the assignee hereof and incorporated herein by reference, relates to an improved non-contact measuring distance system which exhibits high sensitivity and resolution over the effective measurement range of the system, is virtually insensitive to variations in temperature and provides a high degree of linear relationship between the output provided and the distance to be measured. The measuring system of Patent No. 4,160,204 generally comprises a high frequency signal source, an inductive transducer and a reference impedance (both connected in a signal phase network and to the source), and a means for comparing the signals from the transducer and the reference impedance to provide an output related to the distance between the transducer and the object. A circuit element such as a capacitor is connected in parallel with the transducer for the purpose of enhancing the sensitivity and resolution of the system, for significantly reducing or effectively eliminating errors caused by temperature variations in the transducer or in the object measured, and for providing a high degree of linear relation between the output provided and the distance measured.

While well suited for its intended purposes, the inductance sensor measuring system of Patent 4,160,204 does suffer from the drawback that its measurement can be effected by the particular material which define the gap boundaries. This sensitivity to gap boundary composition may adversely affect the accuracy of the measurement system. Also, because the system is based on inductive measurement, the prior art system of Patent 4,160,204 cannot measure gaps where the boundary are not metallic (e.g. such as plastic materials).

SUMMARY OF THE INVENTION

The above-discussed and other drawbacks of the prior art are overcome or alleviated by the contactless distance measuring apparatus of the present invention. In contrast to the inductive measuring system of Patent 4,160,204, the present invention utilizes capacitance to measure the gap between two boundaries. As a result, the distance measurement provided by this invention can be independent of the gap boundary materials; and can therefore be used to measure gaps in non-metals such as plastics.

An important feature of the present invention is a novel thin, three-terminal capacitive transducer which is positioned in the clearance gap to be measured. This transducer comprises an insulated assembly having three parallel conductive planes with the first and second plane each containing a single electrode and the third plane containing a pair of spaced electrodes. Preferably, each electrode is composed of a thin layer of copper mounted on an insulated substrate such as an epoxy-glass composite. An air space is provided between each of the pair of electrodes in the third plane and the single electrode in the second plane.

Another important feature of the present invention is a novel electronic circuit for use in conjunction with the novel three terminal capacitive transducer. This circuit provides a means of "synthetic resonance" whereby a small capacitance (such as the three-terminal capacitive sensor of this invention) functions as if it were at or near series resonance with a synthesized large inductance. This is achieved by using a synthesized network (which is a variation of a known twin-tee circuit) in the feedback path of a high gain amplifier, thereby inverting the normal rejection notch into a resonance-like peak at a frequency determined by the equation:

$$f = \frac{1}{2\pi} \sqrt{\frac{C}{LC_2 C_3}}$$

where
C input arm capacitance of first "tee" branch
$C_2$ = input arm capacitance of second "tee" branch
$C_3$ = output arm capacitance of second "tee" branch
L middle leg inductance of second "tee" branch The novel synthetic resonance circuit of this invention may be used in conjunction with instrumentation other than capacitive measurement devices. For example, the synthetic resonance circuit of this invention may be used with inductive sensors of the type disclosed in Patent 4,160,204.

The above-discussed and other features and advantages of the present invention will be appreciated and understood by those of ordinary skill in the art from the following detailed description and drawing.

BRIEF DESCRIPTION OF THE DRAWINGS:

Referring now to the drawings, wherein like elements are numbered alike in the several FIGURES:

FIGS. 1A and 1B are diagrammatic views showing the dielectric field of a capacitive transducer in accordance with the prior art and the present invention, respectively;

FIG. 2A is a perspective view of the capacitive transducer of the present invention;

FIG. 2B is an electrical schematic diagram of the transducer of FIG. 2A;

FIG. 3 is another electrical schematic diagram of the transducer of FIG. 2A;

DESCRIPTION OF THE PREFERRED EMBODIMENT

Figure 4:
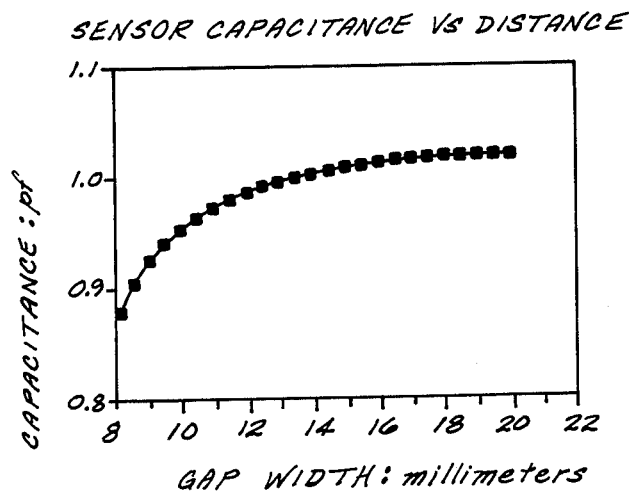
FIG. 4 is a graph depicting capacitance verse distance for the transducer of FIG. 2A.

Capacitive sensors are known and depend upon the change in dielectric field between electrodes of different potential. Typical prior art capacitive sensors utilize the parallel plate geometry depicted in FIG. 1A at 10. However, in accordance with an important feature of the present invention shown in FIG. 1B, the geometry of the sensor of this invention includes a pair of capacitor plates 12 and 14 which are spaced apart in the same plane to form an arching electrical field 16. It has been found that the electrode configuration of FIG. 1B will maximize the change in dielectric field between the electrodes for more accurate and reliable measurements.

Turning now to FIGS. 2A and 2B, the novel capacitive sensor or transducer of the present invention is shown generally at 18. Sensor 18 comprises a pair of spaced electrodes 12 and 14, both of which reside in the same plane. A coupling plate 20 is spaced back from electrodes 12, 14 in a Plane parallel to the electrodes. Suitable members 22 of an insulating dielectric material such as an epoxy-glass composite is positioned between coupling plate 20 and electrodes 14, 16 to define air spaces 24 and 26; and a central channel 28. In addition, a layer of insulating dielectric material 30 is attached to the side of plate 20 which is opposite electrodes 12 and 14. The structure comprising electrodes 14, 16, coupling plate 20 and insulating layers 22 and 30 define an insulating/coupling structure which is attached to a flat zero potential ground plate 32. It will be appreciated that during use, ground plate 32 is placed under the insulating/coupling structure to provide a physical contact reference to one side or boundary of the gap to be measured. Finally, a pair of coaxial cables 34 and 36 are respectively connected to ground plate 32 and electrode 12; and to ground plate 32 and electrode 14. Thus, a capacitive "tee" network is formed which has the "pi" network equivalent of a 3-terminal capacitor and which has the equation:

$$C_{eq} = \frac{(C_A)^2}{2C_A + C_B} \quad (1)$$

The above equation (1) is reflected in FIG. 3 which is an equivalent electrical schematic of the sensor of FIGS. 2A and 2B.

The capacitive sensor of FIGS. 2A, 2B and 3 provides several significant features and advantages as a result of the novel insulated coupling structure of coupling plate 20 and electrodes 12 and 14. For example, in accordance with the present invention, sensor geometry can be scaled without changing sensor capacitance ($C_{eq}$). This is because the relative position of the coupling plate 20 between electrodes 12, 14 and ground plate 32 (together with type and proportion of insulating material selected) control the ratio of $C_B$ to $C_A$.

Still another important feature of the capacitive sensor of this invention is that the temperature coefficient of the sensor capacitance ($C_{eq}$) can be made zero, even though the dielectric constant of the insulating material 22 has a positive (or a negative) temperature coefficient. Depending upon the ratio of $C_B$ to $C_A$, their relative rates of change with temperature can be adjusted to maintain $C_{eq}$ constant. This is most easily accomplished by lowering the temperature coefficient of $C_A$ by proportioning the area of air-gap 24, 26 to insulation 22.

In a preferred embodiment of the present invention, the sensor coax cables 34 and 36 are connected to the "3 terminal" inputs of a known capacitance bridge (such as the Model 2500 1 kHz Automatic Capacitance Bridge manufactured by Andeen-Hagerling of Chagrin Falls, Ohio); or preferably to the novel "synthetic resonance" circuit described below with reference to FIG. 10. Both of these circuits effectively ignore shunt capacitances (and cable capacitance) to ground and measure only the value of $C_{eq}$.

Sensor 18 is preferably fabricated from copper-clad epoxy glass circuit board material, dimensioned such that $C_B$ equals 15 pf and $C_A$ is 5 pf. Using these dimensions, Sensor capacitance, $C_{eq}$, is then 1 pf. If $C_A$ is proportioned to have the proper area of air-gap to epoxy glass, the high positive temperature coefficient of $C_B$ (denominator) can be ratioed to unity by the lower coefficient of $C_A$.

Referring now to FIG. 4, the capacitance change is shown for sensor 18 as the gap to a grounded metal plate varies. The 1 pf sensor capacitance is shown to decrease as the metal plate approaches, effectively reducing the arching dielectric field between electrodes (reducing both $C_A$'s).

It will be appreciated that while FIG. 2A depicts a single pair of coplanar electrodes 12 and 14, the present invention also contemplates the use of multiple coplanar pairs of electrodes having an interleaved configuration.

Turning now to FIGS. 5-13, the novel synthetic resonance circuit of the present invention will now be described. As discussed above, this novel circuit is the preferred electronic circuit to be used with the novel capacitive sensor of FIG. 2A. However, it will be appreciated that the synthetic resonance circuit of this invention may also be used in a variety of additional applications.

Figure 5:
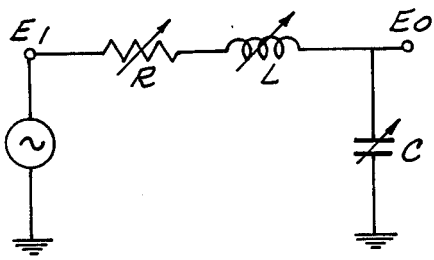
FIG. 5 is an electrical schematic of a known RLC circuit.
Figure 6:
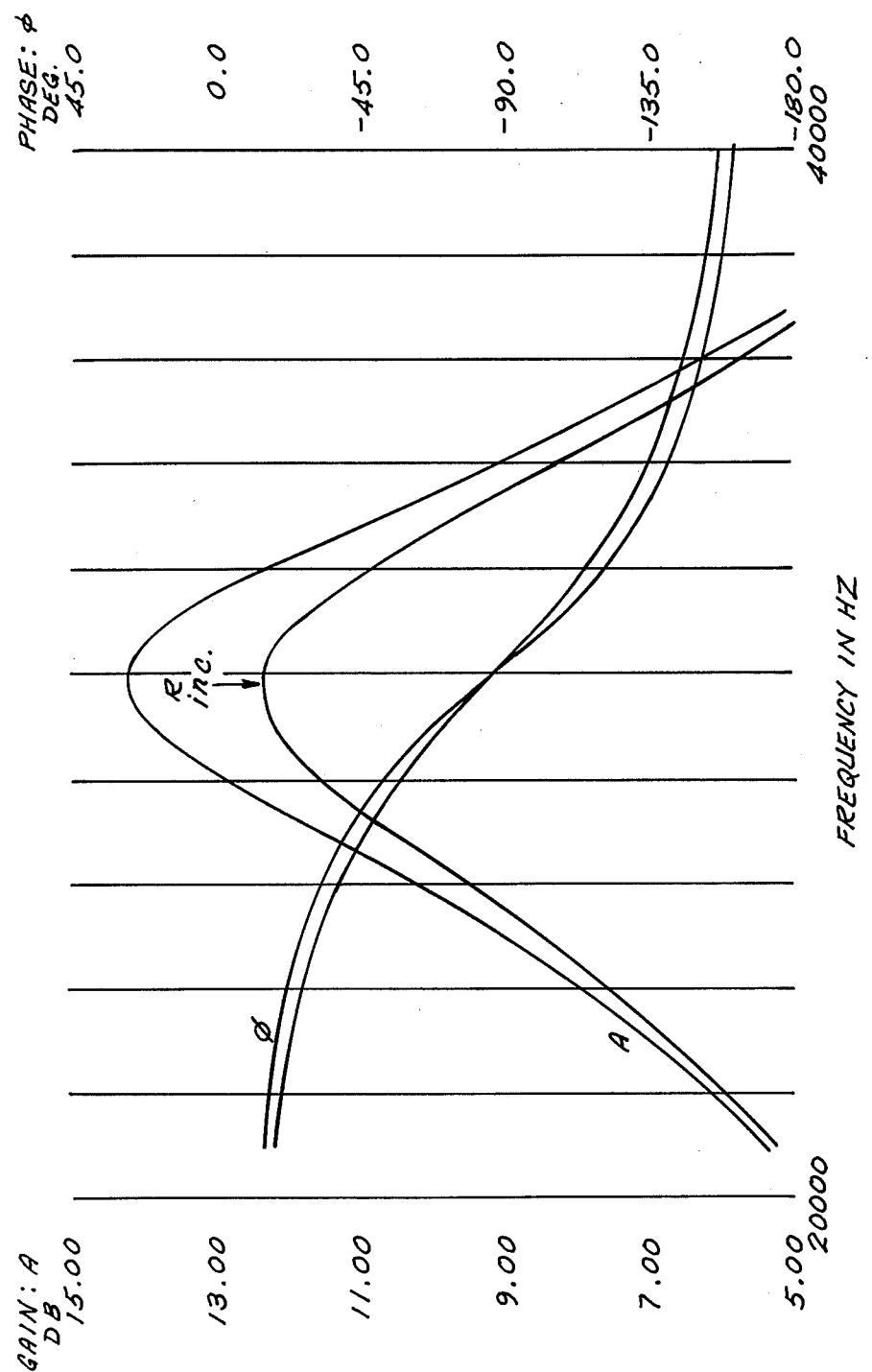
FIG. 6 is a graph depicting natural series resonance for the RLC circuit of FIG. 5.

In FIGS. 5 and 6, a simple known RLC network is shown which offers powerful instrumentation development potential for a broad range of physical measurement requirements. If a physical quantity causes one or more of these electrical proportionality constants to vary, the series resonant network provides extremely attractive transduction possibilities. If either L or C is the variable, a very sensitive change in the phase of $E_o$ is detectable (this sensitivity being controlled by R). If R is the variable, the amplitude of $E_o$ is the detectable change. Thus, it is capable of creating either amplitude or phase modulation from the three basic electrical parameters. The limits of application of this relatively simple network usually arise from an inability to combine practical values to satisfy the resonance equations:

$$f = \frac{1}{2\pi \sqrt{LC}} \text{ or } Q = \frac{2\pi f L}{R} = \frac{1}{2\pi f CR}$$

If L or C is necessarily small due to the nature of the physical measurement, f may become impractically large or more often, R may become too large (or thermally unstable) to allow a stable sensitivity.

A means for overcoming the natural limitations of component values required in the simple network of FIGS. 5 and 6 is therefore highly desirable. A successful approach has been to synthesize a network with electrical behavior equivalent to that of a series resonant circuit but using simple low cost components to generate the properties impossible to obtain from an actual inductor and small capacitor. Instrumentation literature in the 1940's described a twin-tee network employing a small inductive leg and capable of balancing to a sharp null. The mathematical analysis showed that at null, the network was equivalent to a very large inductor in parallel with a small capacitor. In effect, the actual small shunt inductor had equivalent electrical behavior to a several hundred thousand times larger inductance. Unfortunately, at null no usable signal voltage remains for detection or further processing. However, if this null network is incorporated into the negative feedback path of a high gain amplifier, the signal null can be inverted into a signal peak (removal of negative feedback). The transfer function of this signal "selective" circuit can be shown to be equivalent to that of a natural series resonant network (which would require an impossible inductor).

Transfer Function: $A = \frac{E_o}{E_i} = \frac{1}{1 - \omega^2 CL + j\omega CR}$ $$\phi = -\tan^{-1}\left(\frac{\omega c R}{1 - \omega^2 CL}\right)$$

where
$\phi$ = phase angle between voltages $E_o$ and $E_i$
$w = 2\pi f$

Figure 7:
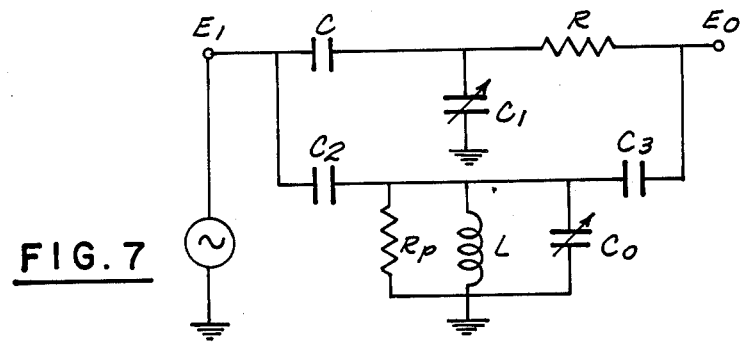
FIG. 7 is an electrical schematic of a known inductive twin-tee circuit.
Figure 8:
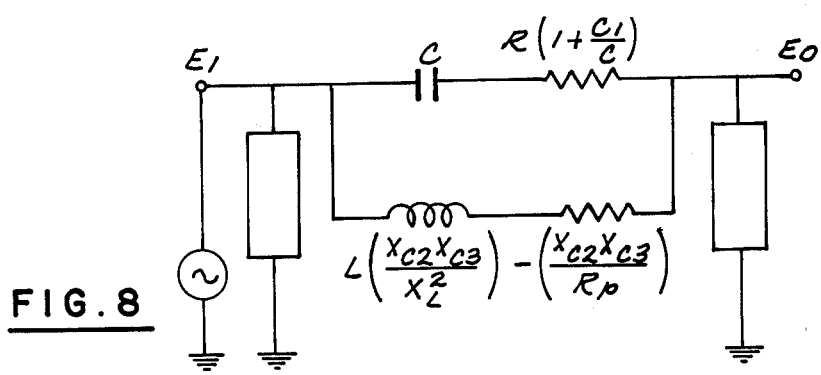
FIG. 8 is an electrical schematic of a known twin tee bridge circuit.

The traditional inductive twin-tee network (also known as inductive parallel tee network) was configured (as shown in FIG. 7) with two variable capacitors $C_1$, and $C_o$ to achieve a zero voltage transfer. As can be seen in FIG. 8, by mathematical conversion of the parallel "tees" to equivalent "pi" networks, the significant characteristics for creating synthetic resonance are more apparent.

The equivalent "Pi" transformation include:

$X_L = 2\pi f L$ $X_L = 2\pi f L$ $X_{c2} = \frac{1}{2\pi F C_2}$ $X_{c3} = \frac{1}{2\pi F C_3}$ At null: $f = \frac{1}{2\pi} \sqrt{\frac{C}{LC_2C_3}}$ At balance, the actual C is parallel with an equivalent resonating inductance equal to the actual L multiplied by the large ratio:

$$\frac{X_{C2} X_{C3}}{X_L^2}$$

Figure 9:
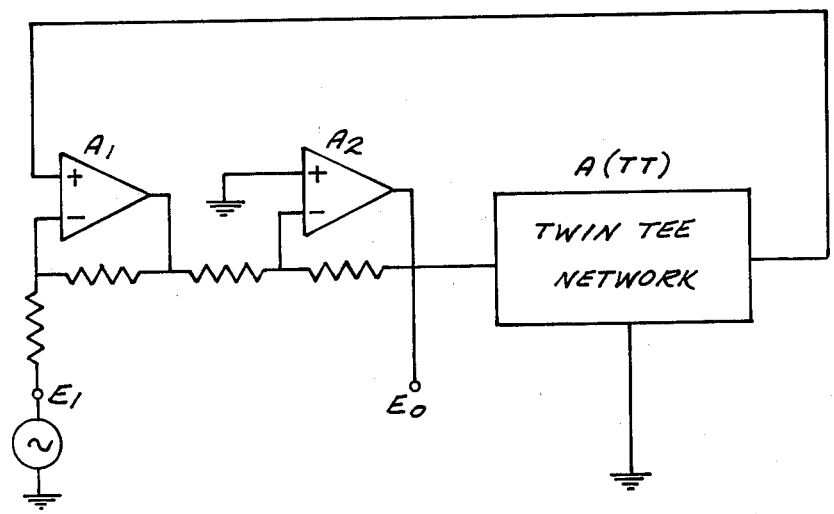
FIG. 9 is an electrical schematic of a twin tee circuit incorporated into the feedback path of a high gain amplifier.

However, it will be appreciated that several aspects of this twin-tee must be reconfigured in order to achieve a practical synthetic resonant circuit. First, the null has to be inverted into an amplitude peak. Referring to FIG. 9, it is noted that if a twin tee network is incorporated into the feedback path of a high gain amplifier, the network's transfer function will be inverted by the feedback equation. Whereas the twin-tee is normally operated with the null balanced to zero, an infinite resonant peak is neither possible nor desirable. For the twin-tee to function as a feedback network, the null is degraded to approximately −80 db and adjusted to a slightly lower frequency than the desired resonance. Since the null equations are only exact at true balance, they are used as approximations in the resonant loop, with "Q" and the resonant phase angle of −90° determined in practice by providing at least two adjustable twin-tee components. The closed loop transfer function for the feedback equation of FIG. 9 is:

$$\frac{E_o}{E_i} = \frac{A_1 A_2}{1 + A_{(TT)} A_1 A_2}$$

Figure 12:
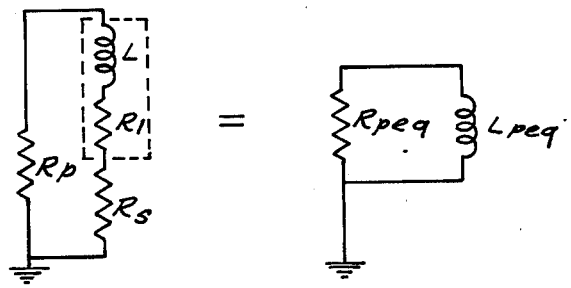
FIG. 12 is an electrical schematic of the inductive leg network.
Figure 13:
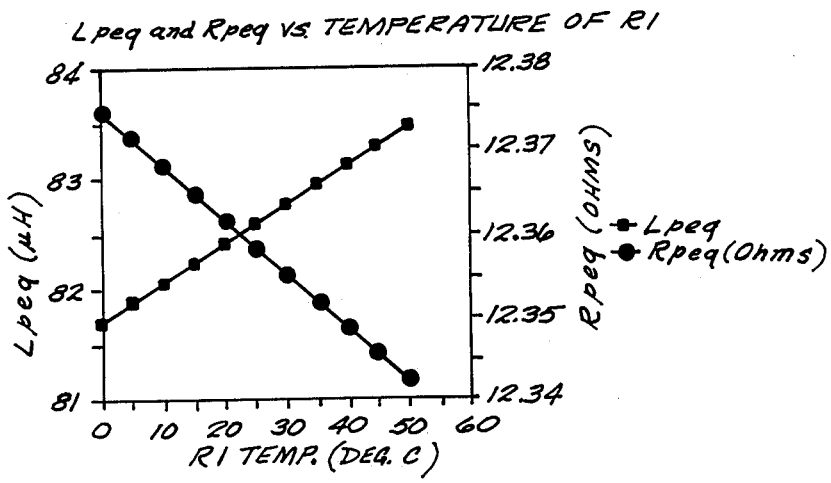
FIG. 13 is a graph of Lpeq and Rpeq versus temperature.

Second, the classical twin-tee must be modified to provide stability against oscillations. Not only must the transfer function be adjusted to provide a +90° phase angle at null, the phase lead at higher frequencies must remain less than +180° in order to avoid regenerative feedback. (A preferred embodiment example with a 1 picofarad capacitive sensor is shown in FIG. 10). Note that $R_3$ (5 ohm) and Rp (35 ohm) have been incorporated to reduce the Q of the physical inductor L and its coil resistance, $R_i$. Otherwise $C_2$ and L would form a high Q series resonance at 360 KHZ, resulting in excessive positive phase angle and possible parasitic oscillation. Total loop gain will be a function of all resistors ($R_2/R_1$, $R_4/R_3$, $R_p$, $R_s$, $R_i$, R) and $C_1$. Therefore, a convenient adjustment for Q at resonance is potentiometer R. Resonance frequency will be a function primarily of C, L, $C_2$ and $C_3$ (with some interaction from the gain determining variables). Rp and Rs also play an important function in the temperature compensation of L's coil resistance, $R_i$. FIG. 12 shows the inductive leg network and the equivalent Lpeq and Rpeq. FIG. 13 is a graph of the behavior of Lpeq and Rpeq as $R_i$ varies with temperature. Since Lpeq is a resonant frequency variable, its value and rate of change can be controlled by the proportion of temperature stable $R_s$ to $R_i$. Also $R_p$ is selected such that the rate of change of Rpeq will adjust loop gain sufficiently to hold resonant frequency constant as temperature varies.

Figure 11:
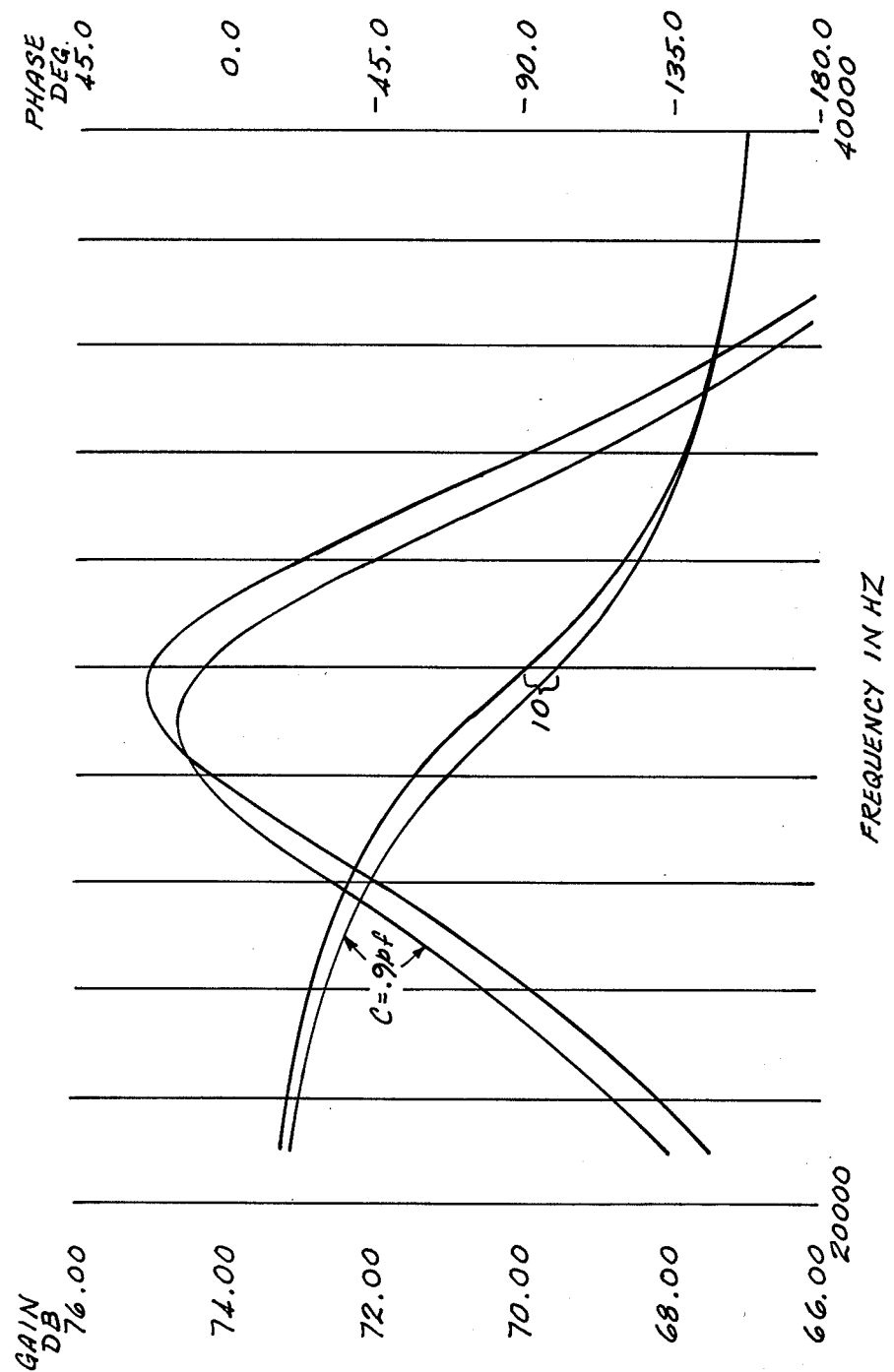
FIG. 11 is a graph depicting synthetic resonance for the circuit of FIG. 10.
Figure 10:
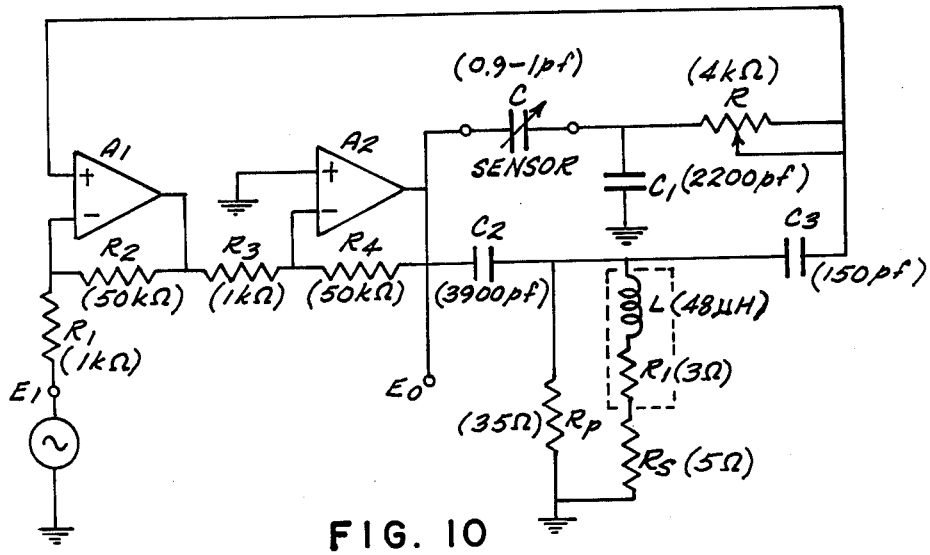
FIG. 10 is an electrical schematic of the synthetic resonance circuit of the present invention.

The example of FIGS. 10 and 11 show that a 1 picofarad sensor (such as the type shown in FIG. 2A) will have the equivalent transfer function of 30 KHZ series resonance with a 27.9H synthetic inductor (or approximately 600,000 times the actual inductance). In this case, the sensor has 0.1 (10%) change of capacitor over its displacement range (which results in a 10° phase angle change). In the Example shown in the FIGS. 10 and 11:

$$X_L = 2\pi FL = 9.1 \text{ ohm}$$

$$X_{c2} = \frac{1}{2\pi FC_2} = 1360 \text{ ohm}$$

$$X_{c3} = \frac{1}{2\pi fC_3} = 35.4K \text{ ohm}$$

$$L_{syn} \simeq L\left(\frac{X_{c2}X_{c3}}{X_L^2}\right) = 27.9 \text{ Henry (synthetic inductor)}$$

$$f_{sr} \simeq \frac{1}{2\pi}\sqrt{\frac{C}{LC_2C_3}} = 30_KH_z \text{ (synthetic resonance frequency)}$$

Although it has been shown that the synthetic resonance circuit of the present invention can be very sensitive to small capacitance change, it should be noted that a similar configuration is of advantage for use with inductive (eddy current) sensors. Thus, when operating with an inductive sensor as the L leg of the twin-tee, the equivalent series inductance is typically a million times L; thereby functioning as a resonant network at a far lower frequency than would normally be possible with such small C and L values. Also, by employing a varactor for $C_3$ and a phase detector, the twin-tee can be phase-locked (or forced to balance) at resonance; thereby creating a control loop output voltage with the advantages that a closed loop system has over an open-loop transducer.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A capacitive sensor comprising:
    at least one pair of first electrode means, said first electrode means being spaced apart and being coplanar in a first plane;
    coupling plate means spaced from said pair of first electrode means in a second plane, said second plane being parallel to said first plane;
    ground plate means spaced from said coupling plate means in a third plane, said third plane being parallel to said first and second planes, and said second plane being sandwiched between said first and third planes;
    first dielectric material being positioned between said first electrode means and said coupling plate means;
    second dielectric material being positioned between said coupling plate means and said ground plate means;
    a first gap between one of said first electrode means and said coupling plate means;
    a second gap between the other of said first electrode means and said coupling plate means; and
    said coupling plate means being electrically isolated from said pair of first electrode means and from said ground plate means.

2. The sensor of claim 1 wherein:
    said first dielectric material comprises first and second pairs of discrete members, one pair of said members being associated with each of said first electrodes;
    said first gap residing between said first pair of members; and
    said second gap residing between said second pair of members.

3. The sensor of claim 1 wherein:
    said first and second gaps are air gaps.

4. The sensor of claim 2 wherein:
    said first and second gaps are air gaps.

5. The sensor of claim 1 wherein:
    said first and second dielectric material is comprised of epoxy-glass composite.

6. The sensor of claim 2 wherein:
    said first and second dielectric material is comprised of epoxy-glass composite.

7. The sensor of claim 1 wherein:
    said first electrode means, coupling plate means and ground plate means comprise copper.

8. The sensor of claim 1 wherein:
    a channel is defined between said spaced apart pair of first electrode means, said channel being defined by said first dielectric material and said coupling plate means.

9. The sensor of claim 2 wherein:
    a channel is defined between said spaced apart pair of first electrode means, said channel being defined by said first dielectric material and said coupling plate means.

10. The sensor of claim 1 including:
    a first coaxial cable connected to said one of said pair of first electrode means and to said ground plate means; and a second coaxial cable connected to the other of said pair of first electrode means and to said ground plate means.

11. The sensor of claim 10 including:
electronic circuit means communicating with said first and second coaxial cables for measuring the distance between two boundaries.

12. An electronic circuit for creating synthetic resonance comprising:
an inductive parallel tee network; and
high gain amplifier means, said inductive parallel tee network electrically communicating with the feedback path of said high gain amplifier means to thereby invert the rejection notch of said inductive parallel tee network into a synthesized resonance peak at a predetermined frequency.

13. The circuit of claim 12 wherein:
said high gain amplifier means comprises a first amplifier connected in series to a second amplifier.

14. The circuit of claim 12 wherein said inductive parallel tee network comprises:
a first tee branch having a first input arm, a first output arm and a first middle leg between said first input and output arms, and including a first input capacitance C on said first input arm, a first output resistance R on said first output arm and a first grounded variable capacitance $C_1$ on said first middle leg;
a second tee branch having a second input arm, a second output arm and a second middle leg between said second input and output arms, and including a second input capacitance $C_2$ on said second input arm, a second output capacitance $C_3$ on said second output arm and an inductance L on said second middle leg; and
a loop comprising a resistance $R_p$ electrically communicating with a variable capacitance $C_o$, said loop electrically communicating between second input arm capacitance $C_2$ and said second output arm capacitance $C_3$.

15. The circuit of claim 14 wherein said predetermined frequency is derived by:

$$f = \frac{1}{2\pi} \sqrt{\frac{C}{LC_2C_3}}$$

16. The circuit of claim 14 wherein:
said high gain amplifier means comprises a first amplifier connected in series to a second amplifier.

17. The circuit of claim 16 including:
a first resistance $R_2$, a second resistance $R_3$ and a third resistance $R_4$ all connected in series and being electrically responsive to said first and second amplifier.

18. The circuit of claim 13 including:
a first resistance $R_2$, a second resistance $R_3$ and a third resistance $R_4$ all connected in series and being electrically responsive to said first and second amplifier.

19. The circuit of claim 12 wherein said inductive parallel tee network comprises:
a first tee branch having a first input arm, a first output arm and a first middle leg between said first input and output arms, and including a first input variable capacitance C on said first input arm, a first output variable resistance R on said first output arm and a first capacitance $C_1$ on said first middle leg;
a second tee branch having a second input arm, a second output arm and a second middle leg between said second input and output arms, and including a second input capacitance $C_2$ on said second input arm, a second output capacitance $C_3$ on said second output arm, an inductance L connected in series to a resistance $R_i$ and a resistance $R_s$, said inductance L, resistance $R_i$ and resistance $R_s$ all on said second middle leg; and
a resistance $R_p$ electrically communicating between said second input arm and said second middle leg resistance $R_s$.

20. The circuit of claim 19 wherein:
said high gain amplifier means comprises a first amplifier connected in series to a second amplifier.

21. The circuit of claim 20 including:
a first resistance $R_2$, a second resistance $R_3$ and a third resistance $R_4$ all connected in series and being electrically responsive to said first and second amplifier.

22. The circuit of claim 19 wherein said predetermined frequency is derived by:

$$f = \frac{1}{2\pi} \sqrt{\frac{C}{LC_2C_3}}$$

23. The circuit of claim 19 wherein:
said variable capacitance C comprises a capacitive sensor.

24. The circuit of claim 23 wherein said capacitive sensor comprises:
at least one pair of first electrode means, said first electrode means being spaced apart and being coplanar in a first plane;
coupling plate means spaced from said pair of first electrode means in a second plane, said second plane being parallel to said first plane;
ground plate means spaced from said coupling plate means in a third plane, said third plane being parallel to said first and second planes, and said second plane being sandwiched between said first and third planes;
first dielectric material being positioned between said first electrode means and said coupling plate means;
second dielectric material being positioned between said coupling plate means and said ground plate means;
a first gap between said one of said first electrode means and said coupling plate means; and
a second gap between the other of said first electrode means and said coupling plate means.

25. The sensor of claim 24 wherein:
said first dielectric material comprises first and second pairs of discrete members, one pair of said members being associated with each of said first electrodes;
said first gap residing between said first pair of members; and
said second gap residing between said second pair of members.

26. The sensor of claim 24 wherein:
a channel is defined between said spaced apart pair of first electrode means, said channel being defined by said first dielectric material and said coupling plate means.

27. The sensor of claim 24 including:

a first coaxial cable connected to said one of said pair of first electrode means and to said ground plate means; and a second coaxial cable connected to the other of said pair of first electrode means and to said ground plate means.

28. A capacitive sensor comprising:

at least one pair of first electrode means, said first electrode means being spaced apart and being coplanar in a first plane;

coupling plate means spaced from said pair of first electrode means in a second plane, said second plane being parallel to said first plane;

ground plate means spaced from said coupling plate means in a third plane, said third plane being parallel to said first and second planes, and said second plane being sandwiched between said first and third planes;

first dielectric material being positioned between said first electrode means and said coupling plate means;

second dielectric material being positioned between said coupling plate means and said ground plate means;

a first gap between one of said first electrode means and said coupling plate means;

a second gap between the other of said first electrode means and said coupling plate means;

said first dielectric material comprising first and second pairs of discrete members, one pair of said members being associated with each of said first electrodes;

said first gap residing between said first pair of members; and said second gap residing between said second pair of members.

29. The sensor of claim 28 wherein:
said first and second gaps are air gaps.

30. The sensor of claim 28 wherein:
said first and second dielectric material is comprised of epoxy-glass composite.

31. The sensor of claim 28 wherein:
a channel is defined between said spaced apart pair of first electrode means, said channel being defined by said first dielectric material and said coupling plate means.

32. A capacitive sensor comprising:

at least one pair of first electrode means, said first electrode means being space apart and being coplanar in a first plane;

coupling plate means spaced from said pair of first electrode means in a second plane, said second plane being parallel to said first plane;

ground plate means spaced from said coupling plate means in a third plane, said third plane being parallel to said first and second planes, and said second plane being sandwiched between said first and third planes;

first dielectric material being positioned between said first electrode means and said coupling plate means;

second dielectric material being positioned between said coupling plate means and said ground plate means;

a first air gap between one of said first electrode means and said coupling plate means; and a second air gap between the other of said first electrode means and said coupling plate means.

33. A capacitive sensor comprising:

at least one pair of first electrode means, said first electrode means being spaced apart and being coplanar in a first plane;

coupling plate means spaced from said pair of first electrode means in a second plane, said second plane being parallel to said first plane;

ground plate means spaced from said coupling plate means in a third plane, said third plane being parallel to said first and second planes, and said second plane being sandwiched between said first and third planes;

first dielectric material being positioned between said first electrode means and said coupling plate means;

second dielectric material being positioned between said coupling plate means and said ground plate means;

a first gap between one of said first electrode means and said coupling plate means;

a second gap between the other of said first electrode means and said coupling plate means; and a first coaxial cable connected to said one of said pair of first electrode means and to said ground plate means; and a second coaxial cable connected to the other of said pair of first electrode means and to said ground plate means.

34. The sensor of claim 33 including:
electronic circuit means communicating with said first and second coaxial cables for measuring the distance between two boundaries.

* * * * *